United States Patent [19]
Sarayeddine

[11] Patent Number: 5,833,339
[45] Date of Patent: Nov. 10, 1998

[54] PROJECTION SYSTEM IMPROVEMENT

[75] Inventor: Khaled Sarayeddine, Nouvoitou, Lebanon

[73] Assignee: Thomson multimedia S.A., Courbevoie, France

[21] Appl. No.: 753,355

[22] Filed: Nov. 25, 1996

[51] Int. Cl.⁶ .................................................... G03B 21/14
[52] U.S. Cl. .............................................. 353/20; 353/78
[58] Field of Search .................................. 353/20, 8, 74, 353/77, 78, 98; 349/5

[56] References Cited

U.S. PATENT DOCUMENTS 5,573,324  11/1996  DeVaan ..................................... 353/77

FOREIGN PATENT DOCUMENTS 0657769  6/1995  European Pat. Off. ......... G03B 21/10
0659024  8/1995  European Pat. Off. .......... H04N 9/31

OTHER PUBLICATIONS

SID International Symposium—Digest of Technical Papers, vol. 25, No. 26., 14–16 Jun. 1994, San Jose US, pp. 399–402, R. Maurer et al. Cholestric Reflectors With a Color Pattern.

*Primary Examiner*—William C. Dowling
*Attorney, Agent, or Firm*—Joseph S. Tripoli; Frederick A. Wein

[57] ABSTRACT

A back-projector projection system, which includes a projector which emits a light beam, a screen and means for directing the light beam onto the screen. The means for directing the light beam onto the screen includes a first means which circularly polarizes, in a first sense, the light beam output by the projector, at least one polarization filter which reflects light circularly polarized in a second sense opposite to the first sense, and a plane mirror. The polarization filter and the plane mirror are positioned substantially parallel to each other to make the light beam output by the first means undergo three reflections, between the polarization filter and the plane mirror, before directing the beam onto the screen.

12 Claims, 3 Drawing Sheets

PROJECTION SYSTEM IMPROVEMENT

BACKGROUND

The present invention relates to a projection system, and more particularly to a system referred to as a back-projector. Back-projectors, which are at present commercially available, are systems which more particularly use a liquid-crystal projector as the projector. However, the present invention may be applied to any type of projection system, in particular to projection systems which employ tubes.

As represented in FIG. 1, a back-projector of known type includes a projector 1 which emits a light beam 2, a screen 3 and means 4 and 5 for directing the light beam onto the screen 3.

In FIG. 1, the means making it possible to direct the light beam 2 onto the screen 1 consist of two plane mirrors 4 and 5 which are arranged so as to reflect the totality of the light beam onto the entire surface of the screen, while limiting the overall thickness of the system which is to be inserted into a casing 6 of limited thickness T.

Inspite of the use of two mirrors positioned, as represented in FIG. 1, for a screen with a diagonal length of 46", i.e. 117 cm, the thickness of the back-projector is still nevertheless about 46 cm. This thickness is too great if it is desired to use wide-screen back-projectors, in particular in small rooms.

SUMMARY OF THE INVENTION

The present invention proposes to reduce the thickness of the back-projector, in particular to a value corresponding to one quarter of the projection distance when the projector is positioned off the projection axis. In effect, considering a projection system in which the projector is positioned off the axis of projection onto the screen, as represented in FIG. 2, the light beam emitted by the projection lens 1 is at a distance d which satisfies the equation:

$$\frac{d}{d'} = \frac{l}{l'}$$

in which l corresponds to the width of the screen, l' corresponds to the width of the electro-optical valve in the case of an LCD type projector, d' corresponds to the distance from the electro-optical valve to the projection lens, or more precisely to the principal plane of the projection objective, and d corresponds to the distance from this lens to the screen, or the projection distance. This projection distance can be divided by four if a technique of folding the light beam is employed, making it possible to reflect the light more than twice.

The object of the present invention is to provide a system which makes it possible to obtain this result and is applicable when the projector is positioned either on the projection axis or off the projection axis.

The subject of the present invention is therefore a projection system of the type including a projector which emits a light beam, a screen and mean for directing the light beam onto the screen, characterized in that the means for directing the light beam onto the screen include:

a first means which circularly polarizes in a first sense the light beam output by the projector, at least one polarization filter which reflects light circularly polarized in a second sense, the opposite of the first sense, and a plane mirror, the polarization filter and the plane mirror being positioned such as to make the light beam output by the first means undergo three reflections, between the said polarization filter and the said plane mirror, before directing the beam onto the screen.

According to a preferred embodiment, the polarization filter is a cholesteric filter.

Furthermore, the projector is a liquid-crystal projector emitting a linearly polarized light beam. In this case, the first means consists of a quarter-wave plate.

If the projector emits an unpolarized light beam, the first means includes a means which linearly polarizes the light beam and is associated with a quarter-wave plate producing a circularly polarized light beam.

According to another characteristic of the present invention, the cholesteric filter comprises three cholesteric filters which each reflect a light beam which is in a different spectral band but is circularly polarized in the same sense. Preferably, the three filters are fitted together so as to produce a single plate, the plate being produced on a transparent sheet which forms the screen.

The cholesteric filters are chosen such that their spectral bands respectively cover the red, green and blue bands without overlap between the bands.

Furthermore, in order to obtain correct operation of the cholesteric filters with good reflection and transmission characteristics, the angle of incidence of the light beam on the filter is chosen to be normal to the surface of the filter or to have an angle of incidence of less than 35° with respect to the normal.

BRIEF DESCRIPTION OF THE DRAWINGS

Other characteristics and advantages of the present invention will emerge on reading the following description of a preferred embodiment, given with reference to the appended drawings, in which.

DESCRIPTION OF THE PREFERRED EMBODIMENTS

In order to simplify the description, the same elements have the same references throughout the figures.

The present invention employs the properties of polarization filters, such as cholesteric filters, regarding the transmission and reflection of circularly polarized light in order to obtain multiple reflection of the linearly polarized light output by the projector which, in the present case, is an LCD type projector. In effect, cholesteric filters have the property of reflecting light polarized circularly in a first sense and transmitting light polarized circularly in the other rotation sense. This property is obtained when the light beam illuminating the cholesteric filter has an incidence which is perpendicular or less than 35° with respect to the perpendicular. In this case, the reflection and polarization characteristics of the filter are good.

Figure 1:
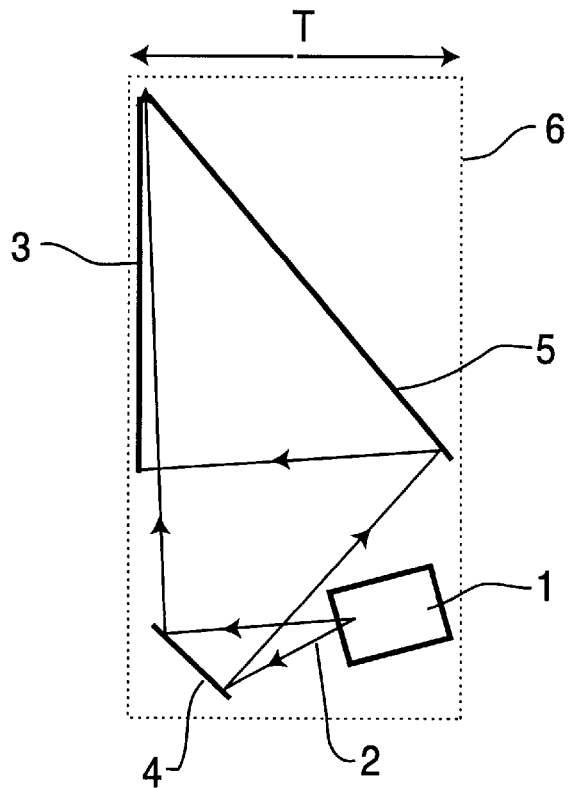
FIG. 1, already described, is a schematic sectional view of a back-projector according to the prior art.
Figure 2:
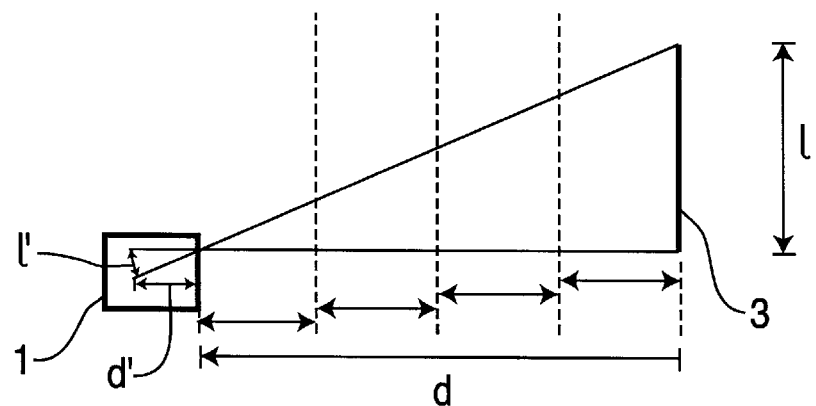
FIG. 2, already described, is a side view explaining the operation of a back-projector in which the projection device is placed off the projection axis.
Figure 3:
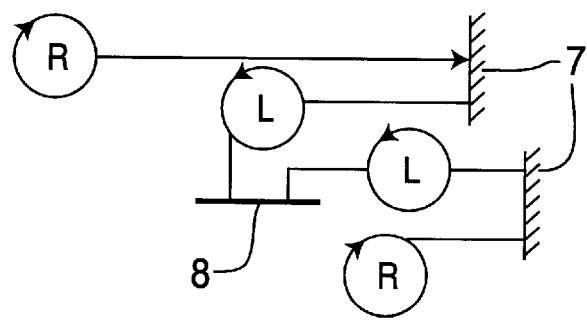
FIG. 3 is a view explaining the operating principle of a back-projector using polarization filters.
Figure 4:
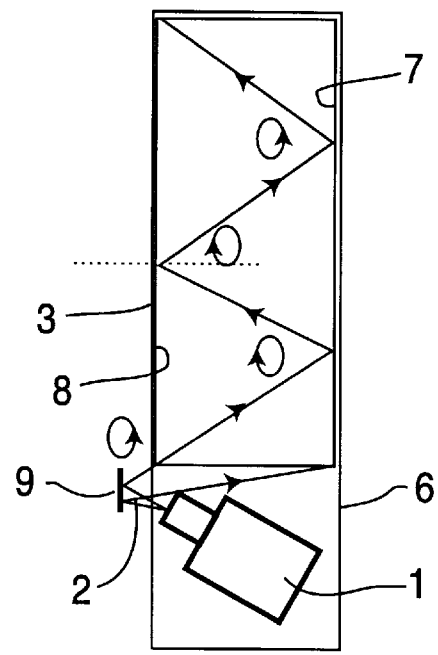
FIG. 4 is a schematic sectional side view of a back-projector according to the present invention.

A more detailed description will now be given of the operation of a back-projector which uses cholesteric filters in order to reduce the thickness of the casing, with reference to FIGS. 3 and 4. FIG. 3 schematically represents the modifications of the rotation sense of the polarization of the light as a function of the means from which the light is reflected. Thus, the input light is right-circularly polarized. At a first reflection from a plane mirror 7, it becomes left-circularly polarized, then it is reflected from a cholesteric filter 8 while remaining left-circularly polarized. After a second reflection from a plane mirror, it emerges right-circularly polarized (R). With reference to FIG. 4, a more detailed description will be given of the back-projector which employs the above principle. In this case, the projector 1, which is a liquid-crystal projector, emits a beam 2 which is already linearly polarized. This beam 2 is directed onto a small mirror then onto a quarter-wave plate 9, so as to produce circularly polarized light. This circularly polarized light, for example right-circularly polarized if use is made of cholesteric filters which reflect left-circularly polarized light, is transmitted through the cholesteric filter 8 and is reflected from the plane mirror 7. In this case, it undergoes a π phase-shift during reflection and the beam is then left-polarized. The beam leaving the plane mirror 7 then encounters the cholesteric filter 8. Since the cholesteric filter reflects any left-polarized light, the light leaving the mirror is reflected from the mirror 7 where is undergoes a further π phase-shift. Reflection from the plane mirror therefore converts left-polarized light into right-polarized light, which is then fully transmitted by the cholesteric filter to the screen. Thus, in the system according to the present invention, three reflections take place, two from the plane mirror and one from the cholesteric filter, as clearly represented in FIG. 4. With a system of this type, a back-projector having a thickness of 20 cm can be obtained with a projection distance of 80 cm. In the present case, as will be seen in FIG. 4, the projector 1 is positioned fully off the projection axis of the system. However, this characteristic is not necessary in the context of the present invention, which merely makes it possible to obtain a minimum height for the projection system, as represented in FIG. 4.

The present invention employs the properties of polarization filters such as cholesteric filters.

In cholesteric liquid crystals, the elongate molecules are arranged in layers. In each of these layers, the long axes of the molecules are mutually parallel along the direction n̄. The director n̄ of these molecules tilts through some 10 to 20 minutes of arc over the successive layers. Molecules therefore describe a helix whose axis is perpendicular to the substrate framing the liquid crystal. When the director has tilted through 360 degrees, the structure is then reproduced. A plurality of structures (for example 20) are necessary for filtering a white beam.

An unpolarized white beam incident on the filter is considered as being the sum of linearly polarized beams. Each of these polarizations is the sum of 50% right-circular and 50% left-circular. The right-circular polarization, for example, will always encounter the same index n when is passes through the layers, whereas the left-circular polarization will be reflected at each interface. The reflections are added in phase. The reflected spectral band DI is associated with the pitch of the cholesteric structure by: DI=p. dn; p being the pitch and dn being the index variation of the liquid crystal.

Figure 5:
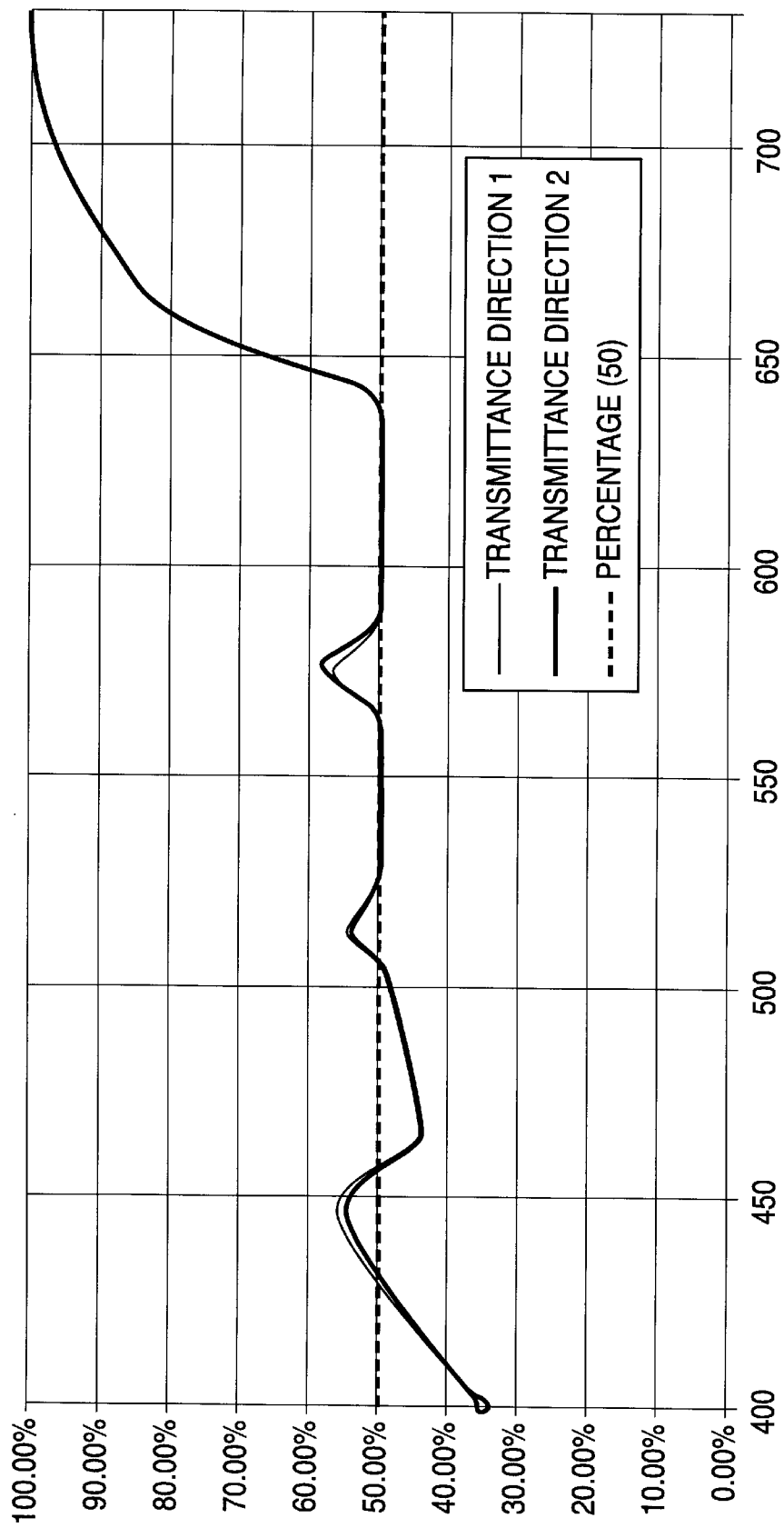
FIG. 5 represents the transmittance characteristic of a cholesteric filter as a function of wavelength.

Cholesteric filters are known polarization filters. They consist of about twenty layers of cholesteric liquid crystals, each layer being equivalent to a layer n/Δn in an interference filter. Cholesteric filters usually reflect one wavelength band, that is to say one colour. In the case of a back-projector, it is therefore necessary to use three filters, each filter reflecting one specific colour, such as red, green and blue. These three filters may be produced in the form of a single plate. Furthermore, since the light is reflected by the internal layers of the cholesteric filter, it is possible to use the second cholesteric-filter/air interface, which is in fact the air/glass surface when the filter is produced on a glass plate, in order to obtain the screen function of the back-projector without losing area and consequently without Fresnel loss. However, in order not to obtain interference in light transmission and not to impair the contrast of the image, the reflection and transmission curves of the cholesteric filters should be chosen with care, so that the reflection curve correctly covers the three bandwidths, namely the red, green and blue bandwidths. An example of a filter which satisfies these criteria is shown in FIG. 5 which represents the transmittance characteristic of the cholesteric filter, formed by fitting together three cholesteric filters, red, green and blue, as a function of wavelength in nm.

The present invention has been described with reference to a liquid-crystal type projector. However, the present invention may be applied to other types of projector. In this case, if the light output by the projector is not linearly polarized, as it is with a liquid-crystal projector, a means for polarizing the light will be necessary in front of the quarter-wave plate.

I claim:

1. Projection system of the type including a projector which emits a light beam, a screen and means for directing the light beam onto the screen, the means for directing the light beam onto the screen comprising:

a first means which circularly polarizes in a first sense the light beam output by the projection, at least one polarization filter which reflects light circularly polarized in a second sense, the opposite of the first sense, and a plane mirror, the polarization filter and the plane mirror being positioned such as to make the light beam output by the first means undergo three reflections, between the polarization filter and the plane mirror, before directing the beam onto the screen.

2. System according to claim 1 wherein the polarization filter is a cholesteric filter.

3. System according to claim 1, wherein the projector is a liquid-crystal projector emitting a linearly polarized light beam.

4. System according to claim 1, wherein the first means consists of a quarter-wave plate.

5. System according to claim 1, wherein in the event that the projector emits an unpolarized light beam, the first means includes a means which linearly polarizes the light beam and is associated with a quarter-wave plate producing a circularly polarized light beam.

6. System according to claim 1 wherein a cholesteric filter comprises three cholesteric filters which each reflect a light beam which is in a different spectral band but is circularly polarized in the same sense.

7. System according to claim 6, wherein the three filters are fitted together so as to produce a single plate.

8. System according to claim 7, wherein the plate is produced on a transparent sheet.

9. System according to claim 8, wherein the transparent sheet forms the screen.

10. System according to claim 6 wherein the three cholesteric filters are chosen such that their spectral bands respectively cover the red, green and blue bands without overlap between the bands.

11. System according to claim 1 wherein the angle of incidence of the light beam on the filter is chosen to be one of normal to the surface of the filter and to have an angle of incidence with respect to the normal.

12. System according to claim 1 wherein the projector is placed off a projection axis, and the polarization filter and the mirror are positioned substantially parallel to each other.

* * * * *